UNITED STATES PATENT OFFICE.

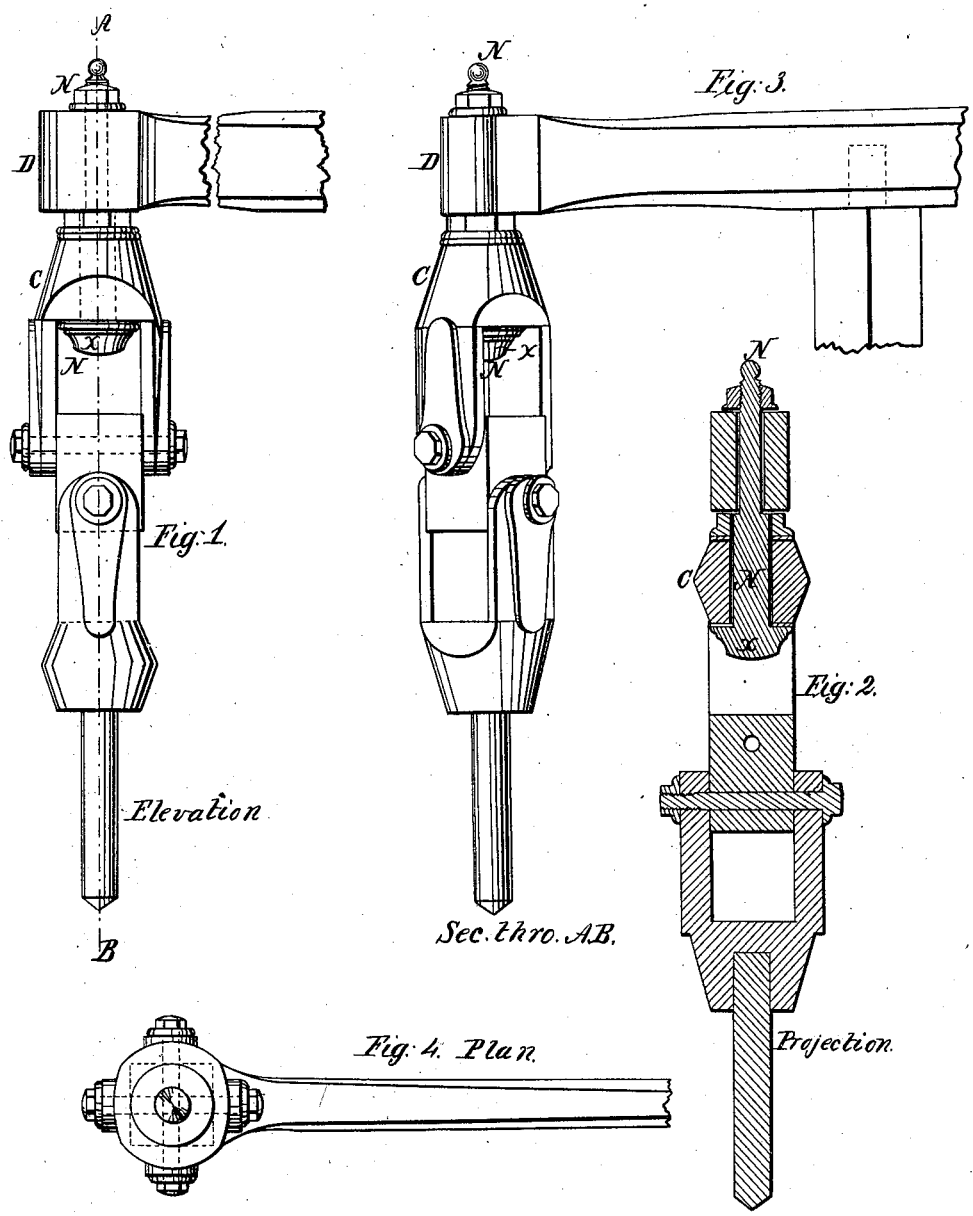

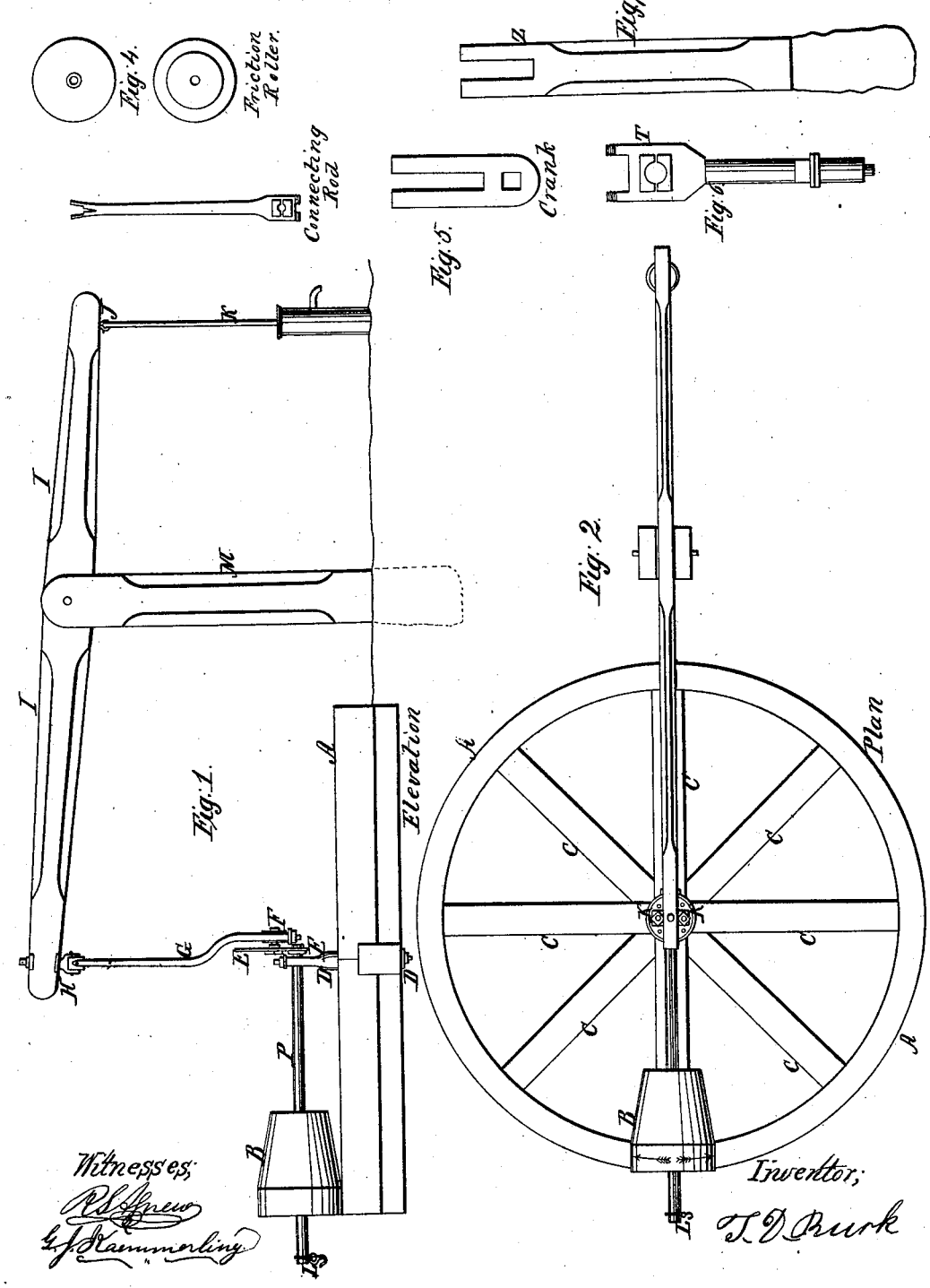

THOMAS D. BURK, OF CHICAGO, ILLINOIS, ASSIGNOR TO J. C. MILLER AND C. A. FOWLER.

LINK-GEARING FOR HORSE-POWERS.

Specification of Letters Patent No. 14,750, dated April 22, 1856.

*To all whom it may concern:*

Be it known that I, THOMAS D. BURK, of the city of Chicago, county of Cook, and State of Illinois, have invented a new and useful Combination of Machinery for Applying Horse - Power (or other Animal-Power) to Machinery; and I do hereby declare that the following is a full, clear, and exact description of the construction and operation of the same, reference being had to the annexed drawings, making a part of this specification, in which—

Figure 1 is an elevation. Fig. 2 is a plan. Figs. 3, 4, 5, 6, and 7 are sections.

In Fig. 1, A— is a circular railway. B— is a friction roller. D— is a revolving standard, the top of which is a journal. E, E, is an arm. F— is a wrist. G— is a connecting rod. H— is a universal joint. "L," "I," is a walking beam. J, is a parallel joint. K, is a connecting rod. M— is a standard. L, P— is a shaft. O— is a chute.

In Fig. 2, A, A, is the periphery of a circular railway. C, C, C, C, are braces of the platform. B— is a friction roller. L— hook.

Fig. 3 is a connecting rod. (In Fig. 1 it is lettered C.)

Fig. 4 is a section of friction roller. (In Fig. 1, it is lettered B.)

Fig. 5 is a section of the arm. (In Fig. 1 it is lettered E, E.)

Fig. 6 is a revolving standard, in the top of which T is a journal. (In Fig. 1 it is lettered D.)

Fig. 7 is a post in which "Z," is a tenon. (In Fig. 1 it is lettered M.)

The nature of my invention consists in the method herein after described of converting the motion of a horse power, into a reciprocating motion at right angles to the rolling motion, without the use of cogwheels or bands.

To enable others skilled in the art to make and use my invention, I will proceed to describe its construction and operation.

I first lay down a circular platform of timber, as represented in Fig. (2). The periphery A is the track for the friction roller. I erect a standard—"M" in Fig. 1— to support the fulcrum of the walking beam. The revolving standard ("D" in Fig. 1) I attach to the bed of the platform; it is constructed with a shoulder which rests, upon washers, on the platform, extends through the platform and is secured by a nut below and through the center of the friction roller B I pass a shaft; one end of which extends through the revolving standard, through the journal. To the other end (L in Fig. 1) of the shaft which extends beyond the periphery of the platform, I attach the animal. The arm (Fig. 5) I attach to the shaft (P in Fig. 1). The arm is constructed as represented in Fig. 5. I attach the connecting rod "G" to the arm E, by a portable wrist. By an offset in the connecting rod "G," I bring the upper portion of the connecting rod parallel with the center of the revolving standard. The walking beam is attached by a fulcrum to the standard. The connecting rod "G" is attached to the walking beam by a universal joint ("H" in Fig. 1).

The universal joint H, is attached to the end of the walking beam, I, I, by a bolt N, N, in the drawing No. 2, hereto attached, which passes through the end of the walking beam, and the upper block of the universal joint, so arranged, and adjusted, by means of a nut "X" (in drawing No. 2) that the universal joint revolves around the bolt.

For the purpose of explaining the construction of that part of my machinery above described, to wit the universal joint and its connection with walking beam, I hereunto annex a drawing numbered 2— and make the same a part of said specification to which this is an amendment.

In which drawing Fig. 1, is an elevation. Fig. 2 is a view of the section through "A, B," in Fig. 1. Fig. 3 is a projection or perspective view, and Fig. 4 is a plan. In those figures—D is the walking beam, N, N, is a bolt, "C," is the upper block of the universal joint, "X" is a nut.

The connecting rod "K," is attached to the end of the walking beam by a parallel joint. The animal is attached to the end of the shaft, and in passing around the circular platform the power is obtained. It is applied to machinery by attaching the connecting rod "K," to the machinery to be driven.

I do not claim the horse-power, consisting of the roller moving in a circular path about a center, as that is old, neither do I claim the universal joint, swivel or other parts by themselves. But

What I claim as my invention and desire to secure by Letters Patent, is—

The above described mode of converting the motion of an axis rolling around a center, into an alternating motion at right angles to the plane described by the rolling axle, by means of the combination of the crank, E, F connecting link, G,—universal joint H, and swiveling bolt of the same,—substantially as herein set forth.

T. D. BURK.

Witnesses:
D. C. BEATTIE,
F. D. OWEN.